(12) United States Patent
Martinsen et al.

(10) Patent No.: US 6,442,559 B1
(45) Date of Patent: Aug. 27, 2002

(54) DYNAMIC SKU MANAGEMENT (75) Inventors: Ronald R. Martinsen, Issaquah;
Jeffrey Alger, Redmond, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/337,915

(22) Filed: Jun. 22, 1999

(51) Int. Cl.[7] .............................................. G06F 17/30
(52) U.S. Cl. ......................................... 707/102; 705/59
(58) Field of Search ................. 707/203, 102; 705/59

(56) References Cited

U.S. PATENT DOCUMENTS

| | | | | |
|---|---|---|---|---|
| 4,757,534 A | * | 7/1988 | Matyas et al. ................. 380/25 |
| 5,724,425 A | * | 3/1998 | Chang et al. .................. 380/30 |
| 5,740,425 A | * | 4/1998 | Povilus ....................... 707/100 |
| 5,758,068 A | * | 5/1998 | Brandt et al. .................. 705/59 |
| 5,897,622 A | * | 4/1999 | Blinn et al. ................... 705/26 |
| 5,903,652 A | * | 5/1999 | Mital .......................... 380/25 |
| 5,905,798 A | * | 5/1999 | Nerlikar et al. ................. 380/3 |
| 5,933,816 A | * | 8/1999 | Zeanah et al. ................. 705/35 |
| 6,012,045 A | * | 1/2000 | Barzilai et al. ................ 705/37 |
| 6,018,724 A | * | 1/2000 | Arent .......................... 705/44 |
| 6,032,130 A | * | 2/2000 | Alloul et al. .................. 705/27 |
| 6,041,411 A | * | 3/2000 | Wyatt ......................... 713/200 |
| 6,061,660 A | * | 5/2000 | Eggleston et al. ............. 705/14 |
| 6,092,189 A | * | 7/2000 | Fisher et al. .................... 713/1 |
| 6,125,352 A | * | 9/2000 | Franklin et al. ............... 705/26 |
| 6,189,146 B1 | * | 2/2001 | Misra et al. ................... 705/59 |
| 6,202,070 B1 | * | 3/2001 | Nguyen et al. ............. 707/104 |
| 6,223,291 B1 | * | 4/2001 | Puhl et al. ................... 713/201 |
| 6,247,128 B1 | * | 6/2001 | Fisher et al. ................ 713/100 |
| 6,272,636 B1 | * | 8/2001 | Neville et al. ................. 705/57 |
| 6,343,280 B2 | * | 1/2002 | Clark .......................... 705/51 |

* cited by examiner

*Primary Examiner*—Wayne Amsbury
(74) *Attorney, Agent, or Firm*—Woodcock Washburn LLP (57) ABSTRACT

A dynamic SKU manager creates versions of programs with different feature sets without a recompilation of the products. Features are enabled either before shipping to a user, or after the user has a partially enabled product. A brand module creates an encrypted value for each version which is unique to the machine on which the program is installed. The encrypted value contains an identifier, a date, and a machine unique name. A query component is called by various components of the program to obtain information about features and capabilities of a currently installed program. It also keeps track of which SKUs are available, and need not be recompiled if no changes have been made to the available SKUs on the machine. The query component is dynamically loaded and unloaded each time it is needed.

32 Claims, 5 Drawing Sheets

DYNAMIC SKU MANAGEMENT

FIELD OF THE INVENTION

This invention relates generally to the field of computer programs and in particular to dynamically managing use of different SKU's of a single version of computer programs.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright © 1998, 1999, Microsoft Corporation, All Rights Reserved.

BACKGROUND

Store keeping units (SKUs) are different versions of a same basic product. The term SKU has been used for many years in different industries, such as to identify different size boxes of cereal. The term is also finding its way for use in the software industry. Many programs have sets of components that are provided in different combinations to form different variations (or feature sets) of a single version of a given program. These different variations of a single version are referred to as SKUs. Further, capabilities, such as the maximum size of a file, or the number of processors that each SKU is permitted to run on, or even the components installed may be varied between SKUs. Prior to the present invention, each SKU program has been separately compiled from source code for running directly on computer systems. One such program has different SKU's with different levels of functionality. Names like Standard Edition, Consumer Edition, Professional Edition, etc . . . are typically given to these different SKU's to differentiate them in the marketplace. Further, some programs have a timer in them which specifies how long a program will operate without license fees or other events occurring. This allows a user to evaluate the program for a limited period of time to see if they desire to pay for further use. Each of these is also a separate SKU which needs to be compiled separately in order to run on a user's computer system.

Having multiple separate products with different functionality which may be compiled at separate times leads to complexity and additional effort in ensuring that the code in each is corrected and changed at the same time. In order for a user to upgrade a SKU to a higher functionality or capability, a separate SKU needed to be sent to the user, or the additional function enabled, which resulted in a recompile of the product being required.

There is a need to more easily deal with multiple SKUs to minimize duplicate effort in maintaining them. There is a further need to provide ease of upgrading versions of programs without having to recompile such programs. There is yet a further need to solve such problems without making it easy for a user to obtain an unauthorized upgrade.

SUMMARY OF THE INVENTION

A dynamic SKU (store keeping unit) manager creates products with different feature sets without a recompilation of the products. Features are enabled either before shipping to a user, or after the user has a partially enabled product. In one aspect of the invention, products with different feature sets are computer programs. One program has multiple feature sets (or flavors) which are referred to as SKUs, or shop keeper units.

The SKU manager has a module referred to as a brand module which contains a unique encrypted value for each SKU. When this module is executed on a user's machine, a unique encrypted value is stored onto the machine on which the program is installed. In one aspect of the invention, the encrypted value contains an SKU identifier, a date, and a machine unique name.

A further module is referred to as a query module which is used to obtain information about features and capabilities of a currently installed program. It also keeps track of which SKUs are available, and need not be recompiled if no changes have been made to the available SKUs on the machine. If it is desired to create a new SKU with a new feature set, the SKU and its rules are added to the query component, a new encrypted value is added to the brand module, and they are dropped into an installation of the program. No other code associated with the program need be recompiled.

Another aspect of the invention involves the dynamic loading of the query and brand modules. By dynamically loading it and unloading it each time it is called, it is more difficult to trace, which in turn makes it more difficult to inappropriately obtain upgrades or higher capability/functional SKUs of a program. The SKU manager minimizes duplicate effort in maintaining multiple SKUs, as the code which provides the various levels of functionality need not be recompiled. Thus, only a single version of the code need be maintained. The SKU manager also provides an easier way to perform authorized upgrades of programs without having to recompile such programs.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. A first section describes the operation of a computer system which implements the current invention. This is followed by an overview description of an SKU manager and its various modules or components that allow the manager to identify SKUs, and determine the features and capabilities of an SKU. A conclusion further summarizes the invention, and provides alternative embodiments and benefits which may be obtained depending on which aspects of the invention are implemented.

Hardware and Operating Environment

Figure 1:
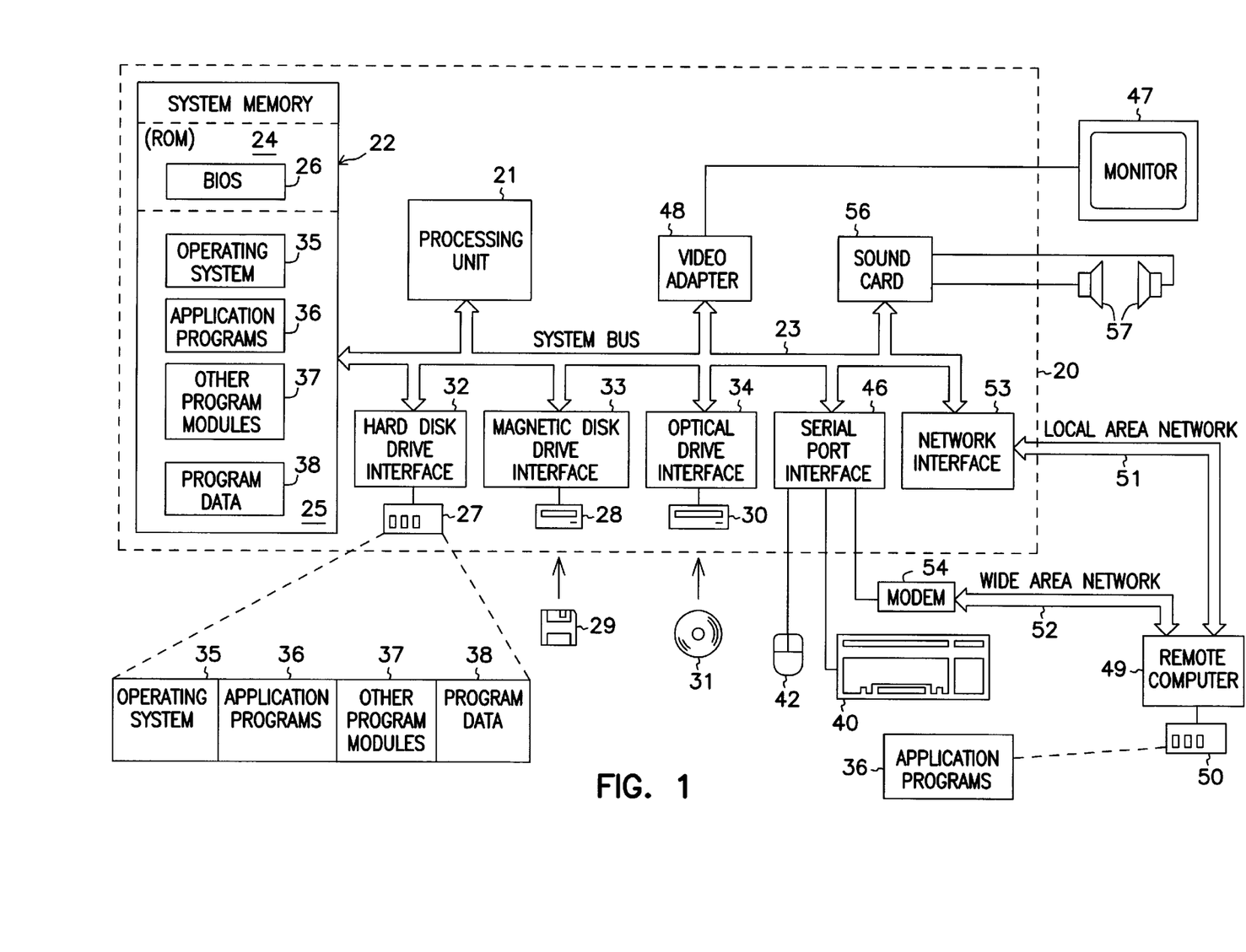
FIG. 1 is a block diagram of a computer system on which the present invention may be implemented.

FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices such as a sound adapter 56, speakers 57 and further devices such as printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising Microsoft® Word which are depicted as residing within 20 or portions thereof may be stored in remote storage device 50. Of course, the network connections shown are illustrative, and other means of establishing a communications link between the computers may be substituted.

Software may be designed using many different methods, including object oriented programming methods. C++ is one example of common object oriented computer programming languages that provides functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

Figure 2:
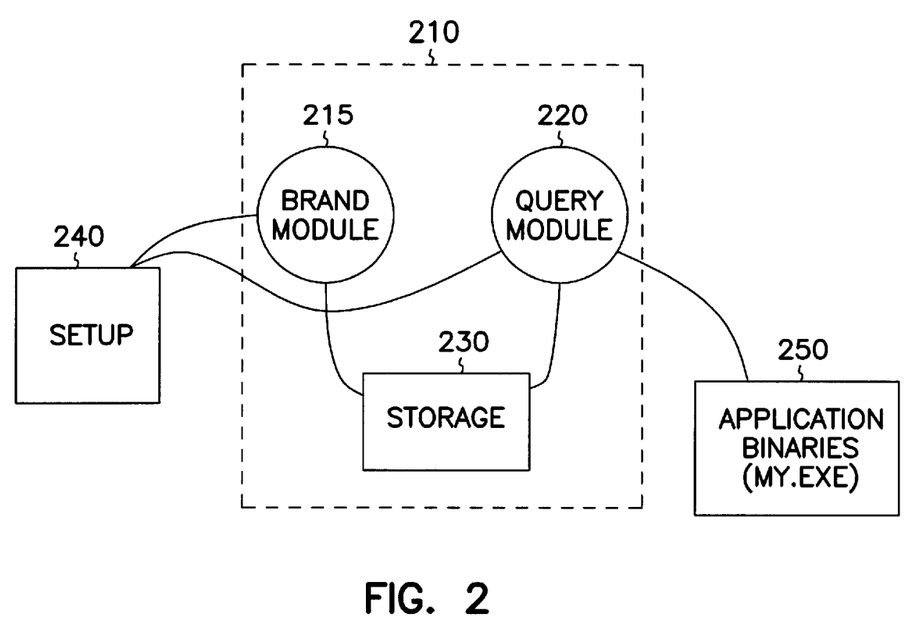
FIG. 2 is a block diagram of an SKU manager.

In FIG. 2, an SKU (store keeping unit) manager is indicated at 210 and comprises a brand module 215, a query module 220 and permanent storage 230, which may be a disk drive device or other storage device such as disk drive 27. The brand module 215 is a dynamic link library or DLL in one embodiment, but may be any other type of program which can be loaded and run on a programmed computer and programmatically accessed from other running programs. The brand module provides a brand or encrypted value which is unique to a particular SKU for a particular machine that it may run on. Brand module 215 in one embodiment combines an SKU number with an installation date and a machine name into a single concatenated element, and then encrypts it. The encrypted value is stored on storage 230 for later reference by entities desiring to obtain information about the currently installed version of a program. There is a separate brand module for each installable SKU in one embodiment.

A setup module 240 calls the query module 220 which contains information, such as capabilities and functions associated with each SKU. The query module 220 decrypts and unpacks the brand, checks to see if a time period for permissible use of the SKU has expired, and if not, checks with the machine to match the machine identifier (can be the network machine name, a processor id, etc . . . ) with that of the brand for the SKU. This helps ensure that an SKU from a disk drive 27 of a different machine has not been installed. A further check is performed to ensure that an action that the brand module desires to be performed, such as an upgrade, makes sense. Generally, it is not desired to transform a higher function SKU into a lower function SKU. The SKU value from the brand is also cached for performance reasons.

Two components, setup 240 and application binaries, such as my.exe 250 use the services of the query module to determine the functions and capabilities of the installed SKU. Setup 240 calls the brand module 215 to obtain a new brand for each new SKU. As previously stated, the brand module 215 creates the brand for the upgrade or new flavor of product and the query module 220 is used to obtain information about the SKU, including functions enabled and capabilities of the SKU to aid in the installation of the SKU. My.exe 250 is a component of the SKU and is used herein as representative of however many components in an SKU that need SKU dependent information. In essence, it is a module of the actual program that may need to find out what capabilities and functions it uses to operate. Such a module can query the query module 220 to find the information. Since the program need not be compiled with this type of information for each variation or SKU of the program, it does not need to be recompiled following a change of installed SKUs. It simply queries the query module 220 to obtain unique operational information.

Figure 3:
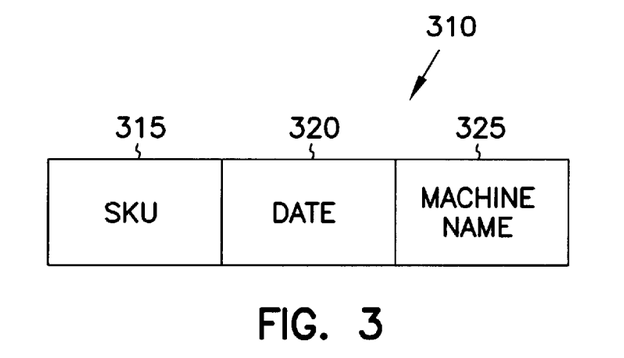
FIG. 3 is a block diagram of a value to be encrypted to identify an SKU.

For each new SKU, brand module 215 creates an encrypted value or brand as shown in block form in FIG. 3 generally at 310. The brand is effectively unique to a particular combination of SKU, the install date, and machine on which it may be installed. The brand is formed with three pieces of information in one embodiment comprising an SKU number 315, a date of installation, and a machine name which may be obtained via standard operating system calls. The SKU number is a randomly chosen number, preferably between 16 and 64 bits which is unique for each SKU of a product. The randomness of each SKU number helps prevent an average user from determining SKU numbers of other SKUs by simply looking at a next consecutive number. The SKU number may be of any size desired that will operate on a desired computer. The date is a standard system date, or any other desired date, and the machine name is a string of between one and thirty or more characters which is unique for a given network of systems. It may be obtained by using an application program interface (API) or standard system call such as GetComputerName in Microsoft's Win32-based operating systems. The command or API to obtain the machine name may vary depending on the operating system or machine on which an SKU is installed. The three pieces of information are concatenated into one long string and then encrypted in a common manner. The strength of the encryption is selected to make it difficult for a power user or average programmer to decrypt the brand. In one embodiment the encryption is the same as that used by Microsoft SQL Server products. Higher security may be obtained by using more powerful encryption as desired.

Once the brand is created, it is stored on secondary or permanent storage in a known location for later use by other components. In one embodiment, it is stored in a registry, a database, a disk file, or any other type of data storage device from which it may be retrieved. It should be noted that a brand module is created for each SKU, with a fixed size SKU identifier. This results in multiple SKUs each of the same size, but each having a different brand module. Since all the SKU's are of the same size, all the brand modules are also of the same size. While the brand has been described as being derived from three pieces of information, other information may be used as desired to create the brand.

Both setup 240 and other components such as program modules represented by my.exe 250 may call query module 220. The function of query module 220 is represented by the flow diagram of the query module indicated generally at 410 in FIG. 4. When it is called by one of the components, it is manually loaded, queried one or more times, and then immediately unloaded in one embodiment to make it more difficult to trace dependencies using tools that show loaded module dependencies. All components use the same process for both the query module and the brand module. The loading and unloading occur in milliseconds in most cases given current processor speeds. Because the query module 220 is loaded for such a short time, memory analysis tools are also unlikely to reveal the dependency. This provides a way to prevent most users from detecting how SKUs are managed.

Figure 4:
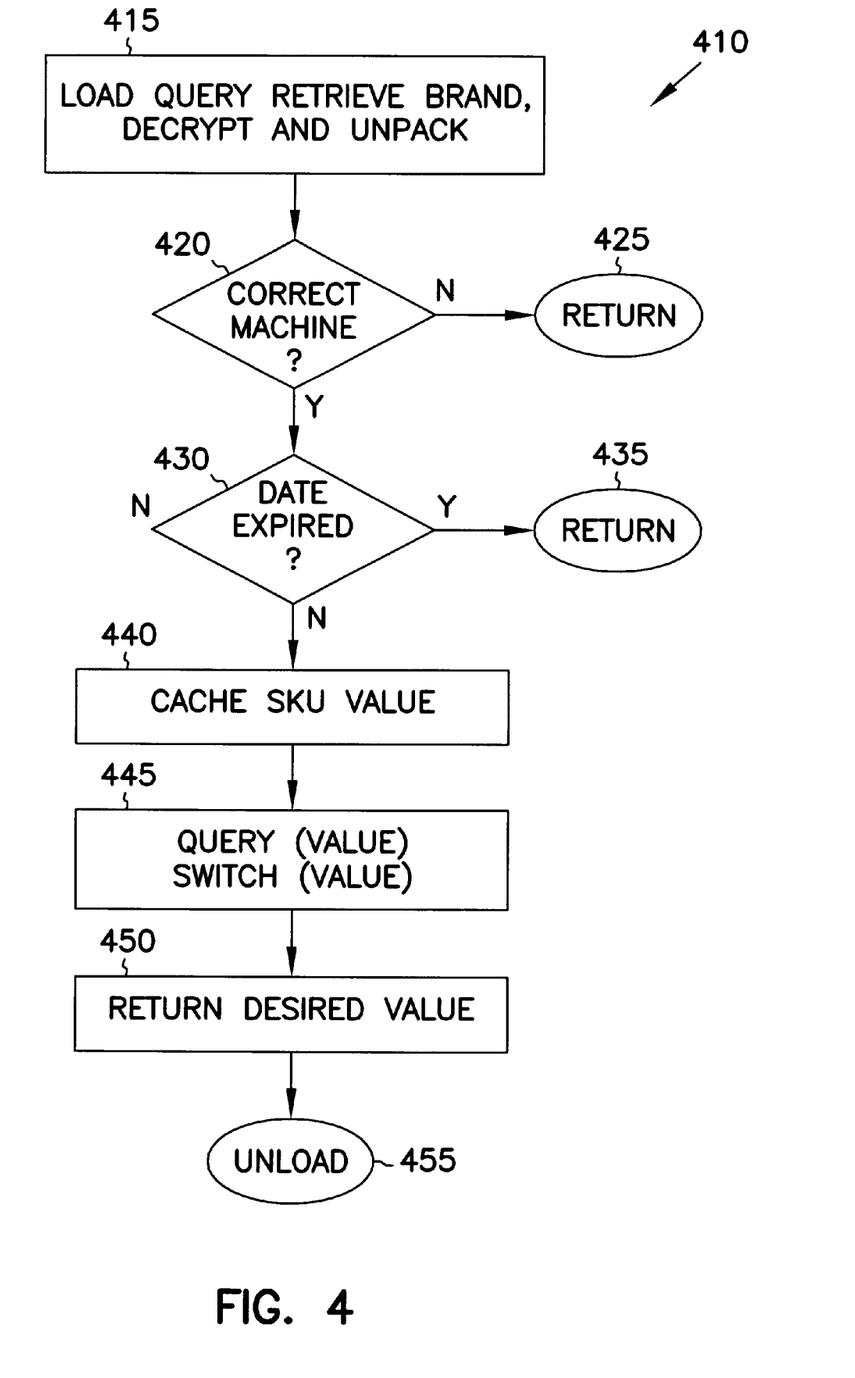
FIG. 4 is a flow diagram of a query module of the SKU manager of FIG. 2.

A series of functions is provided in the query module. One key function involves taking a numeric value that is essentially an id that represents what is being queried, and returning a response—abort, or the value. When a component calls the query module, it does so with a numeric value which corresponds to desired information. Different query functions of the query module may be determined in a standard manner such as by requesting the interfaces to the module. For discussion purposes, it is assumed that a value of "1" corresponds to the maximum size file that can be used with the SKU which is installed.

At 415, the query module is loaded, and then retrieves the brand from a known storage location. It decrypts the brand and unpacks it to reveal the SKU number, date and machine. At 420, it checks to see if the machine name of the brand is the same as the machine name of the current machine by independently obtaining the current machine name and comparing it to the machine name obtained from the stored brand. If they are different, the query module aborts at 425 and may return a special abort value to the calling component indicating the reason for failure. If the correct machine name is noted at 420, a check is made at 430 to determine if the number of days the SKU has been installed exceeds the number of days allowed (only in the case of time-limited versions). If so, the query module again aborts at 435 and may return a special abort value to the calling component indicating the reason for failure. The calling component will likely display a message to a user of the computer indicating that the evaluation period has ended or some other message as desired. When the query module aborts at 425 or 435, it is the responsibility of the calling component to unload it to minimize the time that it is associated with the calling component.

In the case of a time-limited SKU, if the number of evaluation days has not been exceeded at 430, the number of days remaining is returned. If the SKU is not time-limited, then a special "unlimited" value is returned. The SKU value obtained from the brand is also cached at 440 for later use, and the value with which the query module was invoked is used to switch to a case identified by that value. As stated above, a value of "1" corresponds to a file size limit. The calling component may also receive pointers to functions of the query module to enable it to query information available from the query module.

The cached SKU value is used to query data stored by the query component for the result associated with the case for that SKU at 445. Multiple queries may be processed while the query module is loaded. The calling component need not be made aware of the SKU identifier (a number). In one Embodiment, a sub-function is used via an internal call to determine the value to return for a given SKU for the case requested at 450. In this case, the result is a "4", which corresponds to a file size limit of four gigabytes. The query module stores many other values associated with both functions and capabilities which may be needed by many components of the SKUs. In one embodiment, the cases are identified by random numbers to make it more difficult to determine how to obtain unauthorized upgrades by simply attempting to use consecutive numbers. When the calling component is done with querying the query module, it unloads the query module at 455.

Figure 5:
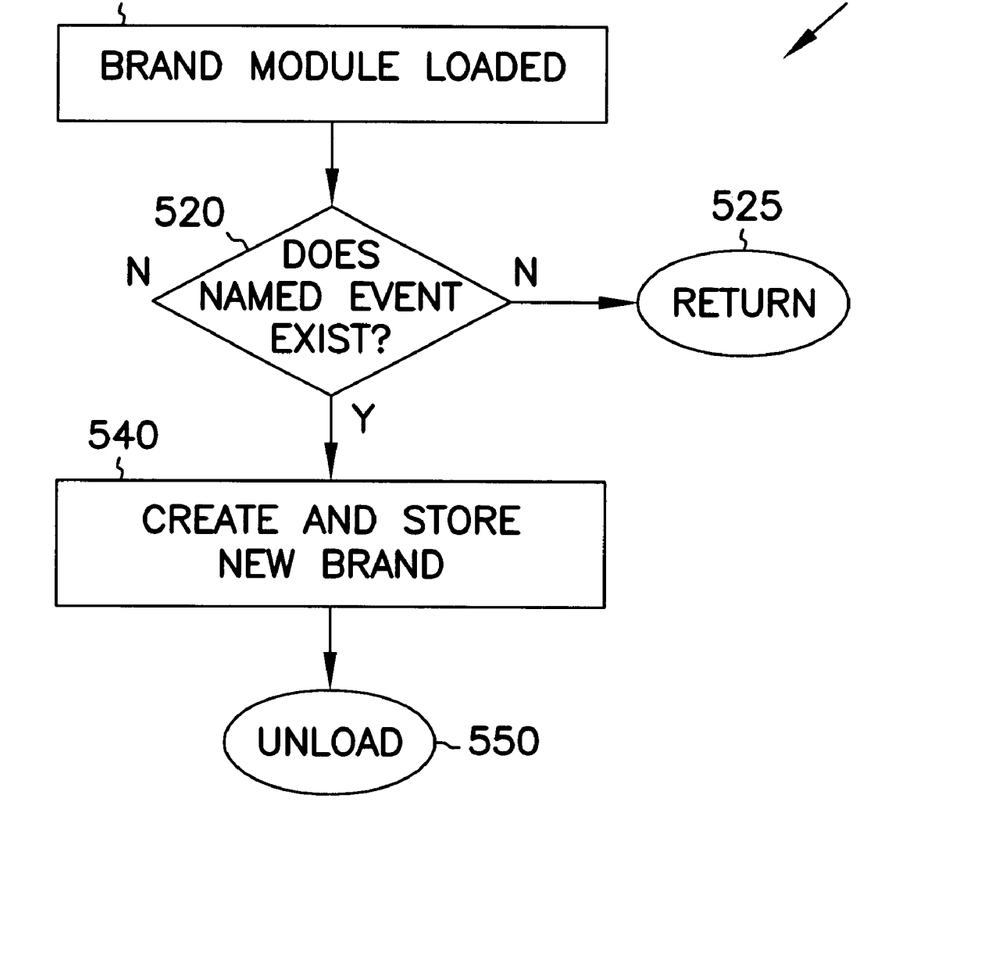
FIG. 5 is a flow diagram of the operation of a brand module of the SKU manager of FIG. 2.

The brand module 215 function is represented in flow chart form generally at 510 in FIG. 5. When setup 240 desires to install a different SKU of a program, it first creates a named event, which is referred to as event "123456" for purposes of illustration. The name may actually be a GUID (globally unique identifier) if desired. In a further embodiment, a shared piece of memory that both components know how to view with the help of the operating system is used. The brand module is aware of the name of the event, and is dynamically loaded with the call at 515. No arguments are taken by the brand module. It hides all of the details about what is stored on the machine and where it is stored. Setup 240 only needs to know that it should call the brand function so that the system can be branded with a given SKU.

At 520, the brand module knows which named event to look for, and if the event is not already created, the brand module aborts at 525. It only has the capability to check for the named event, not to create it. If the named event already exists, the brand module creates a new brand as previously described, and stores it at 540. The brand module is then unloaded at 550.

In one embodiment, setup calls the query component to find out if an upgrade is allowed. If the query component fails to load or returns a special "yes" value, then setup is run. This means that the SKU being installed is greater than or equal to the SKU that is already installed. First, setup asks the brand component for the SKU it is about to install to obtain a SKU number and passes this value to a special query function in the query component that takes a SKU so that the currently installed and about to be installed SKU's can be compared.

Figure 6:
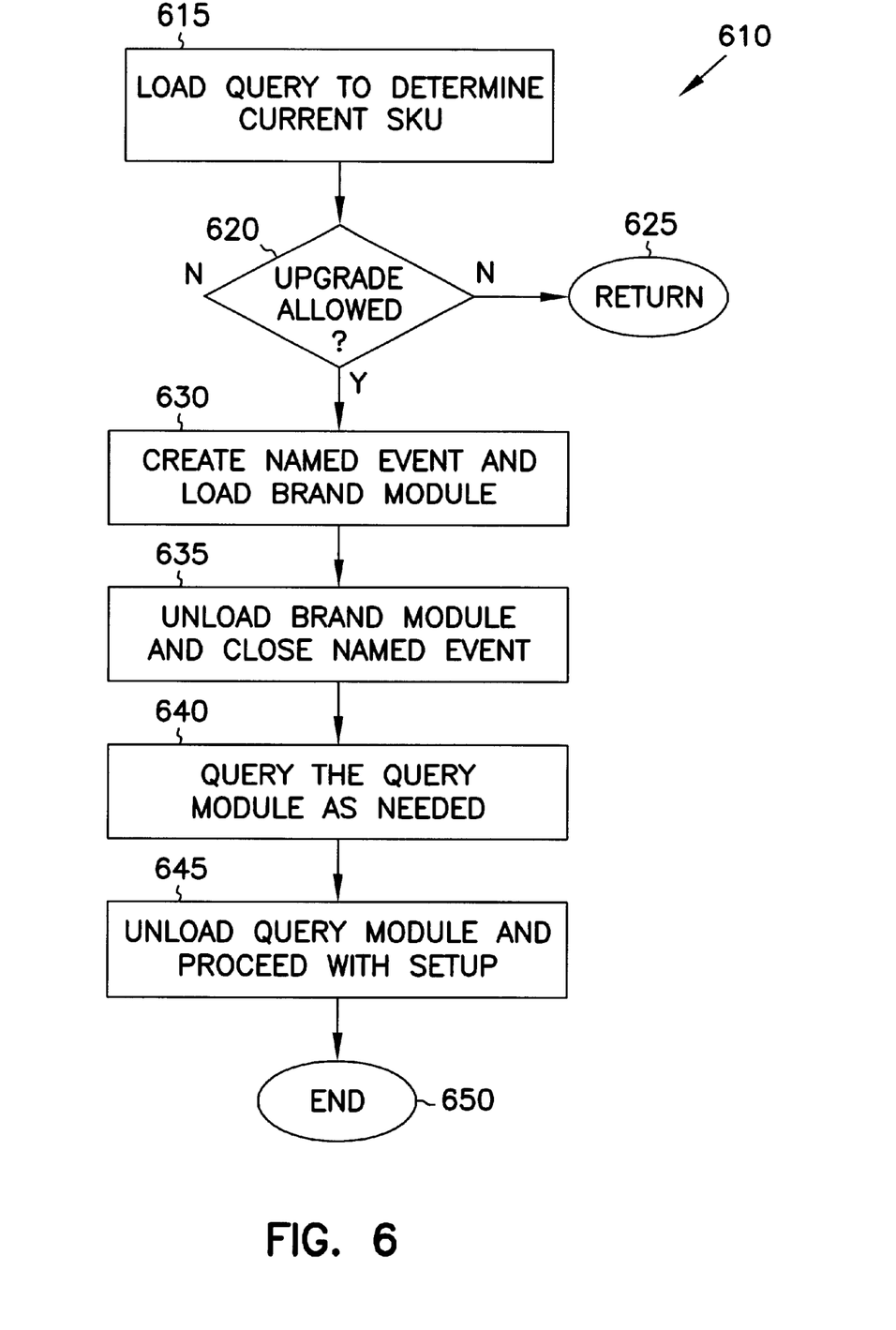
FIG. 6 is a flow diagram of a setup module which uses the brand and query modules.

Operation of the setup module in the upgrade of an SKU is shown in flowchart form generally at 610 in FIG. 6. At 615, after receiving a request to upgrade or perform a maintenance operation on a program, query is dynamically loaded to determine the current SKU which is installed. Query returns an indication of whether or not the upgrade is permitted, which is used in setup to determine whether or not to continue at 620. If the decision is not to continue, setup ends at 625 and may display a message to the requestor of the upgrade. If the upgrade is allowed at 620, a named event is created, and brand module is loaded at 630 to brand the new SKU. At 635, the brand module is unloaded, and the event is closed. At 640, the query module is queried or called as many times as desired to determine the package to be installed and all other information needed to proceed with the upgrade. A package is comprised of a common set of files on a storage medium such as a CD (or a network share) that is shared by a group of SKUs. In one embodiment, there are only four possible packages, even though there are an unlimited number of SKUs. The query module is then unloaded at 645 and setup proceeds with the setup and ends at 650

The query for the package is referred to by a case number, similarly to the query for the maximum database size. The query module also has access to a package SKU for each SKU, and returns it in response to the query from setup. Setup may also issue further queries to determine what to do for installation of a given SKU. Based on these queries, setup is provided information identifying what components to install, if the SKU is designed for the installed version of the operating system, what dialogs to display, what files are available to it from storage, if it is an upgrade or not, and a string in a selected language, such as an English string to display to the user to inform them about the SKU being installed. The English string is one which is called by other executables of the product. Since all of these details are in the query module, and combination of SKUs can be designed without requiring setup to be recompiled.

Several SKUs may have brands associated with them, and data about them stored via the query module. If a new SKU is being added that does not have a brand already created by the brand module, both the brand module and the query module need to be recompiled in order to allow them to provide information about the SKU to components that do not need to be recompiled. In other words, the brand module must be made aware of the another SKU, and a case added in the query module for the SKU. If only limits, such as capabilities associated with a known SKU are changed, only the query component need be recompiled since it needs to be modified to reflect the changed limit.

Conclusion

A dynamic SKU manager creates products with different feature sets without a recompilation of the products. A brand module creates and stores an encrypted value for each SKU which is unique to the machine on which the program is installed. In one embodiment, the encrypted value contains an SKU identifier, a date, and a machine unique name. Other information may also be used, and the brand need not be encrypted in further embodiments. A query module is used to obtain information about features and capabilities of a currently installed program. It also keeps track of which SKUs are available, and need not be recompiled if no changes have been made to the available SKUs. If it is desired to create a new SKU with a new feature set, the SKU and its rules are added to the query component, a new encrypted value is added to the brand module, they are recompiled, and they are dropped into an installation of the program. No other code associated with the program need be recompiled. The brand and query modules may be written in any language, such as C++, and need not be written in an object oriented language.

Another aspect of the invention involves the dynamic loading of the query and brand modules. By dynamically loading it and unloading it each time it is called, it is more difficult to trace, which in turn makes it more difficult to inappropriately obtain upgrades or higher capability/functional SKUs of a program. The SKU manager minimizes duplicate effort in maintaining multiple SKUs, as the code which provides the various levels of functionality need not be recompiled. Thus, only a single version of the code need be maintained. The SKU manager also provides an easier way to perform authorized upgrades of programs without having to recompile such programs.

This application is intended to cover any adaptations or variations of the present invention. It is manifestly intended that this invention be limited only by the claims and equivalents thereof.

We claim:

1. A method of managing SKUs of a software product on a computer system, the method comprising:
   generating a first encrypted brand for an authorized SKU of the software product,
   receiving a second encrypted brand associated with an execution request; and
   responsive to determining that the second brand matches the first brand, providing information associated with the authorized SKU.

2. The method of claim 1, wherein the first encrypted brand is derived from the authorized SKU and at least one of a machine name and a date of installation.

3. The method of claim 1 wherein the information comprises capability information about the authorized SKU.

4. The method of claim 1 wherein the information comprises identification of at least one of a plurality of components associated with the authorized SKU.

5. A computer readable medium having instructions stored thereon for causing a computer to perform a method of managing SKUs of a software product on a computer system, the method comprising:
   generating a first encrypted brand for an authorized SKU of the software product;
   receiving a second encrypted brand associated with an execution request; and
   responsive to determining that the second brand matches the first brand, providing information associated with the authorized SKU.

6. A system for managing software based SKUs, the system comprising:
   a brand module that creates and stores a unique encrypted brand for an authorized SKU; and
   a query module callable by a component wherein the query module determines if the calling component is associated with the authorized SKU and responsive to said determination, dynamically provides information associated with the authorized SKU to the calling component for operation of the SKU.

7. The system of claim 6, wherein the brand module stores the brand in a data store available to the query module.

8. The system of claim 6, wherein the query module decrypts the brand module.

9. The system of claim 6, wherein the encrypted brand is based on at least one of a unique machine name, a date and an SKU wherein said SKU comprises a unique identifier associated with the authorized one of said plurality of variations of the software product.

10. The system of claim 9, wherein the query module checks the unique machine name identified in the brand against the unique machine name of the machine.

11. The system of claim 9, wherein the query module provides information about the SKU based on a combination of a case and an SKU identifier.

12. A method of changing an operating functionality level of a software product comprising:
   receiving a request to change the operating functionality level of a software product stored on a computing device from a first functionality level to a second functionality level;
   determining that the change from the first functionality level to the second functionality level is authorized;
   generating an encrypted identifier that associates the second functionality level with the computing device; and
   providing information associated with the second functionality level to at least one of an installation program and an executable component.

13. The method of claim 12, wherein generating the encrypted identifier is performed by a brand module.

14. The method of claim 13, further comprising:
   dynamically loading the brand module prior to generating the encrypted identifier; and
   unloading the brand module substantially immediately following generation of the encrypted identifier.

15. The method of claim 12, wherein providing information associated with the second functionality level is performed by a query module.

16. The method of claim 15, further comprising:
   dynamically loading the query module prior to at least one of determining that the change from the first functionality level to the second functionality level is authorized and providing information associated with the second functionality level to at least one of an installation program and an executable component; and
   unloading the query module substantially immediately following at least one of determining that the change from the first functionality level to the second functionality level is authorized and providing information associated with the second functionality level to at least one of an installation program and an executable component.

17. The method of claim 12, further comprising:
   receiving a date; and
   associating the second functionality level with the received date.

18. The method of claim 17, wherein determining that the change from the first functionality level to the second functionality level is authorized comprises using the date to ascertain that a period of authorized operation has not been exceeded.

19. The method of claim 12, wherein determining that the change from the first functionality level to the second functionality level is authorized comprises ascertaining that an event associated with the change request was created.

20. The method of claim 12, wherein determining that the change from the first functionality level to the second functionality level is authorized comprises determining that the second functionality level includes at least one of a plurality of features that the first functionality level does not include.

21. The method of claim 20, wherein determining that the second functionality level includes the at least one of a plurality of features that the first functionality level does not include comprises:

determining a first plurality of features associated with the first functionality level;

determining a second plurality of features associated with the second functionality level; and     ascertaining that the first plurality is a subset of the second plurality.

22. The method of claim 12, wherein providing information associated with the second functionality level comprises:

decrypting a received encrypted identifier associated with the second functionality level of the software product stored on the computing device;

ascertaining at least one of a plurality of features associated with the second functionality level;

providing information associated with the second functionality level to at least the one of an installation program and the executable component of the software product.

23. The method of claim 22, wherein the information associated with the second functionality level includes at least one of a plurality of components associated with the second functionality level.

24. The method of claim 23, wherein the at least one of a plurality of components is compatible with the computing device on which the software product is stored.

25. A computer-readable medium including computer-executable instructions for:

receiving a request to change the operating functionality level of a software product stored on a computing device from a first functionality level to a second functionality level;

determining that the change from the first functionality level to the second functionality level is authorized;

generating an encrypted identifier that associates the second functionality level with the computing device on which the second functionality level is stored; and     providing information associated with the second functionality level on the computing device available to at least one of an installation program and an executable component.

26. A system for managing changes to an operating functionality level of a software product comprising:

a query module that decrypts an encrypted functionality level identifier for a software product stored on a computing device and that provides information associated with the functionality level indicator to at least one of an installation program and an executable component of the software product; and     a branding module that generates an encrypted identifier that associates an authorized computing device with an authorized functionality level of a software product stored on the computing device.

27. The system of claim 26, wherein the encrypted identifier associates the authorized functionality level with a date used to determine an authorized period of operation of the authorized functionality level of the software product.

28. The system of claim 27, wherein the encrypted identifier is based on a unique machine identifier of the computing device on which the authorized functionality level of the software product is stored.

29. The system of claim 28, wherein in response to determining that the unique machine identifier of the computing device is identical to the unique machine identifier included within the decrypted encrypted identifier, the authorized functionality level of the software product is loaded.

30. The system of claim 27, wherein the encrypted identifier is based on a unique functionality level indicator of the authorized functionality level of the software product.

31. The system of claim 27, wherein the encrypted identifier is based on a date.

32. The system of claim 31, wherein the date is used to calculate a period of authorized use of the authorized functionality level of a software product.

* * * * *